United States Patent [19]

Isa et al.

[11] 4,421,730
[45] Dec. 20, 1983

[54] PROCESS FOR MANUFACTURING HIGHLY PURE CHLORINE DIOXIDE

[75] Inventors: Isao Isa, Misatomachi; Hideo Yamamoto, Shibukawa; Syuki Shindo, Shibukawa; Morioki Shibuya, Shibukawa, all of Japan

[73] Assignee: The Japan Carlit Co., Ltd., Tokyo, Japan

[21] Appl. No.: 347,257

[22] Filed: Feb. 9, 1982

[30] Foreign Application Priority Data

May 19, 1981 [JP] Japan ............................ 56-75553

[51] Int. Cl.$^3$ .................... C01B 11/02; C01B 15/02
[52] U.S. Cl. ................................ 423/478; 423/272
[58] Field of Search .......................... 423/478, 272

[56] References Cited

U.S. PATENT DOCUMENTS

| 3,717,701 | 2/1973 | Carlson | 423/272 |
|---|---|---|---|
| 3,869,401 | 3/1975 | Ernst | 423/272 |
| 4,051,229 | 9/1977 | Isa et al. | 423/478 |
| 4,154,810 | 5/1979 | Isa et al. | 423/478 |
| 4,158,592 | 6/1979 | Readio | 423/272 |
| 4,178,356 | 12/1979 | Shibuya et al. | 423/478 |
| 4,250,159 | 2/1981 | Cowley | 423/480 |
| 4,250,195 | 2/1981 | Cherukuri et al. | 426/5 |

FOREIGN PATENT DOCUMENTS 53-66892  6/1978  Japan ............................ 423/478

OTHER PUBLICATIONS

Schumb, *Hydrogen Peroxide*, Reinhold Publ. Corp. N.Y. (1955) pp. 544.
Chaberk, *Organic Sequestering Agents*, John Wiley & Sons (1959), pp. 10–13, 326–328.
Encyclopaedia Chimica, vol. 2, p. 364, Sep. 10, 1978.
Chemical Abstracts, vol. 57, 5338d (1962).
Chemical Abstracts, vol. 69, 80733d (1968).
Chemical Abstracts, vol. 69, 80693r (1969).
Kirk-Othimer, Encyclopedia of Chemical Technology, 3rd Ed., vol. 15, pp. 343–345, vol. 2, pp. 376–379, (1978).

*Primary Examiner*—Edward J. Meros
*Assistant Examiner*—Steven Capella
*Attorney, Agent, or Firm*—Frishauf, Holtz, Goodman & Woodward

[57] ABSTRACT

Highly pure chlorine dioxide is generated very efficiently and safely in a single generator-crystallizer by reducing an alkali metal chlorate with chloride ion in a strong acid in the presence of hydrogen peroxide and a complex catalyst of palladium (II) with chloride ion.

6 Claims, 1 Drawing Figure

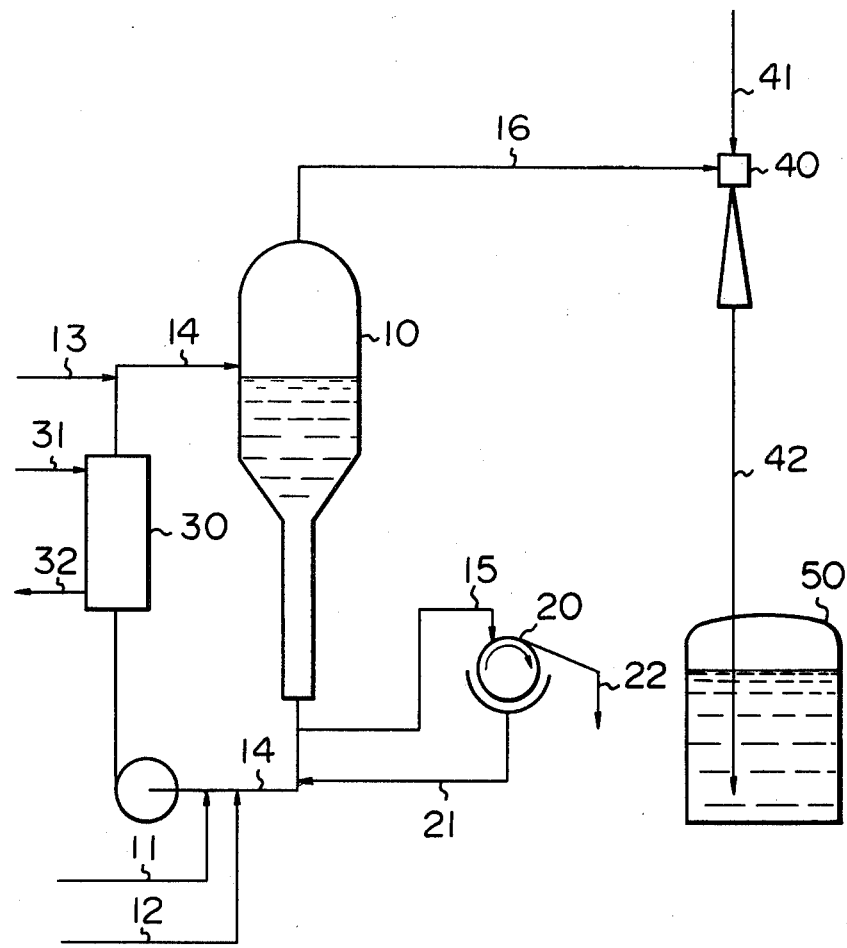

PROCESS FOR MANUFACTURING HIGHLY PURE CHLORINE DIOXIDE

BACKGROUND OF THE INVENTION

1. Field of the Invention

This invention relates to a process for manufacturing highly pure chlorine dioxide by the reaction of chlorate ion, chloride ion and hydrogen peroxide in the presence of a catalyst.

2. Description of the Prior Art

Chlorine dioxide is a commercially important material in such fields as pulp bleaching and fat decoloring, and also has been used for the purpose of environmental protection and pollution abatement as in the removal of phenols from industrial sewage and in denitration of industrial waste gases.

Although chlorine is a historically established disinfectant for potable water, the formation of halogenated organics, particularly trihalomethanes, during its use has recently become a major problem. Chlorine dioxide which does not form any halogenated organics has been used as a disinfectant in the place of chlorine.

Chlorine dioxide is usually generated at points of use because it readily explodes simply upon heating or photoradiating the gaseous phase.

Thus, it is highly desirable to have a process by which highly pure chlorine dioxide can be generated economically. Further, it is desirable to have a safe process in which the generation of highly pure chlorine dioxide can be easily controlled without any danger of explosion.

One of the methods for generating chlorine dioxide is to reduce a chlorate with a reducing agent in a strong acid. The reactions which occur are exemplified below, wherein, for the sake of illustration, the chlorate used is sodium chlorate and the reducing agent is hydrochloric acid.

$$NaClO_3 + 2HCl \rightarrow ClO_2 + \tfrac{1}{2}Cl_2 + NaCl + H_2O \tag{1}$$

$$NaClO_3 + 6HCl \rightarrow 3Cl_2 + NaCl + 3H_2O \tag{2}$$

Reaction (1) must be accelerated in order to reduce the production of the chlorine. A method to achieve this purpose is to use a catalyst which accelerates reaction (1) in preference to reaction (2). However, if reaction (2) does not proceed, the purity of the chlorine dioxide $$\left( \frac{ClO_2(moles)}{ClO_2(moles) + Cl_2(moles)} \times 100 \right) \text{ is less than } 66.7\%.$$

In order to highly purify the chlorine dioxide product, the chlorine gas accompanying the chlorine dioxide must be eliminated from the resulting material. The substantial elimination of the chlorine gas therefrom is very difficult, resulting in the process being costly.

With reference to the catalysts for chlorine dioxide production, complex catalysts consisting of palladium-(II) and an amino acid or an alkali metal salt thereof, palladium(II) and a β-diketone, and palladium(II) and chlorine ion were described in U.S. Pat. Nos. 4,154,810; 4,051,229; and 4,178,356, respectively.

One of the methods for generating highly pure chlorine dioxide is described in U.S. Pat. No. 4,250,159. In this method, chlorine dioxide is generated by reducing sodium chlorate with sulfur dioxide in accordance with the equation:

$$NaClO_3 + \tfrac{1}{2}SO_2 \rightarrow ClO_2 + \tfrac{1}{2}Na_2SO_4 \tag{3}$$

As reaction (3) is slow, chlorine dioxide should be generated at a high acidity of 9.5 to 11 normal and an effluent containing a high concentration of sulfuric acid should be withdrawn. Further, this method is inefficient because the conversion of sodium chlorate to chlorine dioxide is low. Also, the purity of the chlorine dioxide generated is low, because of the poor reactivity of sulfur dioxide. Furthermore, this method may require complicated instrumentation for vaporizing sulfur dioxide.

SUMMARY OF THE INVENTION

It is an object of the invention, therefore, to provide a process for efficiency manufacturing highly pure chlorine dioxide without generating any acid effluent by using an efficient catalyst and hydrogen peroxide.

It is another object of the invention to provide a fully automated process not requiring any personnel for safely manufacturing relatively small quantities of highly pure chlorine dioxide.

Other objects and advantages of the present invention may become apparent to those skilled in the art from the following description and disclosure.

BRIEF DESCRIPTION OF THE DRAWINGS

The attached FIGURE is a partial schematic flow sheet of the present invention.

DESCRIPTION OF THE PREFERRED EMBODIMENT

This invention relates to a process for manufacturing highly pure chlorine dioxide by reducing an alkali metal chlorate with chloride ion in a strong acid in the presence of hydrogen peroxide and a complex catalyst containing palladium co-ordinated with ligands in a single generator-crystallizer at a temperature of 25° to 90° C. under a reduced pressure of 20 to 400 mmHg.

The strong acid used in the process of this invention is generally selected from the group consisting of sulfuric acid, hydrochloric acid and mixtures thereof. The concentration of the sulfuric acid may be from 0.5 to 2.5 moles per liter of the reaction medium. The concentration of the hydrochloric acid may be from 0.01 to 1.0 mole per liter. The preferred concentration of hydrochloric acid is from 0.05 to 0.5 mole per liter. But if the concentration of sulfuric acid is below 0.5 or if that of hydrochloric acid is below 0.01 mole per liter, the rate of chlorine dioxide generation will become too slow to be tolerated commercially. On the other hand, if the concentration of sulfuric acid exceeds 2.5 moles per liter, sodium sesqui-sulfate will precipitate in the single generator-crystallizer, and as a result, the loss of the sulfuric acid will increase. If the concentration of hydrochloric acid exceeds 1.0 mol per liter, the rate of chlorine dioxide generation will become too fast to assure safety.

Said alkali metal chlorate is generally selected from the group consisting of sodium chlorate and potassium chlorate. The concentration of the alkali metal chlorate may be from 0.1 to 5 moles per liter of the reaction medium. If it is below 0.1 mole per liter, the rate of chlorine dioxide generation will become too slow to be tolerated commercially. On the other hand, if it exceeds 5 moles per liter of the reaction medium, it will become too fast to assure safety in operation, and the loss of the expensive chlorate will increase.

The complex catalyst of this invention containing palladium co-ordinated with ligands consists of a combination of palladium(II) with an amino acid or an alkali metal salt thereof (U.S. Pat. No. 4,154,810), palladium(II) with β-diketone (U.S. Pat. No. 4,051,229) or palladium(II) with chloride ion (U.S. Pat. No. 4,178,356). The concentration of said complex catalyst may be from 0.00001 to 0.01 mole per liter of reaction medium. The preferred concentration of said complex catalyst is from 0.00004 to 0.001 mole per liter of the reaction medium. If it is below 0.00001 mole per liter, there will be no obvious catalytic effect. On the other hand, when it is above 0.1 mole per liter, there will be no particular advantage and the production cost will become higher.

Said amino acid includes glycine, alanine, valine, leucine, isoleucine, serine, threonine, cysteine, cystine, methionine, aspartic acid, glutamic acid, lysine, arginine, phenylalanine, tyrosine, histidine, tryptophan, proline, hydroxyproline, β-aminopropionic acid, γ-arinobutyric acid, anthranilic acid and the like.

Said β-diketone includes 2,4-pentanedione; 1-phenyl-1,3-butanedione; 1,3-diphenyl-1,3-butanedione; 1,3-diphenyl-1,3-propanedione; 1,1,1,5,5,5-hexafluoro-2,4-pentanedione; 1-chloro-2,4-pentanedione; 3-methyl-2,4-pentanedione; 4,6-undecanedione and the like.

Said complex catalyst consisting of palladium(II) and chloride ion means a chloropalladinate(II) complex catalyst with its absorption maximum wavelength being preferably longer than about 470 nm.

The concentration of said hydrogen peroxide may be from 0.00005 to 0.1 mole per liter of the reaction medium. If it is below 0.00005 mole per liter, the chlorine dioxide purity will be too low. On the other hand, if it exceeds 0.1 mole per liter, the reaction medium will foam excessively due to oxygen evolution caused by the decomposition of hydrogen peroxide.

It is well known that hydrogen peroxide is extremely unstable in the presence of palladium metal or ions thereof. The decomposition proceeds in accordance with the equation (4).

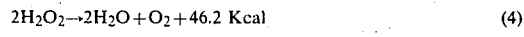

$$2H_2O_2 \rightarrow 2H_2O + O_2 + 46.2 \text{ Kcal} \tag{4}$$

Accordingly, it could hardly be expected from the common knowledge of chemistry that hydrogen peroxide should not be decomposed in the presence of such a complex catalyst containing palladium co-ordinated with ligands as is employed in this invention.

The present invention is further described by way of an example with reference to the attached FIGURE which is a flow sheet illustrating one embodiment of the invention.

An alkali metal chlorate and hydrochloric acid or sulfuric acid is fed to a single generator-crystallizer 10 continuously through lines 12 and 11, respectively. A complex catalyst containing palladium ion as the center metal is fed to the single generator-crystallizer 10 through line 11, line 12 or any other line. The amount of said complex catalyst fed is equal to the amount of said complex catalyst removed together with solid alkali metal chloride or solid alkali metal sulfate produced in the single generator-crystallizer. Hydrogen peroxide is fed to the single generator-crystallizer continuously through line 13. A mixture of chlorine dioxide and water vapor that is produced in the gas phase of the single generator-crystallizer is removed through line 16 and is absorbed in water with a water ejector 40. The concentration of chlorine dioxide in an aqueous chlorine dioxide solution produced at the water ejector is about 1 to 3 grams per liter and then the aqueous chlorine dioxide solution is introduced into a storage tank 50. The reaction medium in the single generator-crystallizer is subjected to a reduced pressure and heated so that boiling takes place. The amount of water removed from the reaction medium by boiling is adjusted to be equal to the net increase in the amount of water added to the system by the materials plus the water produced by the reaction. The level of the reaction medium in the single generator-crystallizer can thus be maintained substantially constant. The water vapor serves to dilute the gaseous products and bring the chlorine dioxide content away from the explosion range, to expel said gaseous products from the solution surface and to help said gaseous products disengage from inside the reaction medium. The loss of heat carried away by the water vapor is compensated by a heat exchanger 30 installed within a recirculating system through which the reaction medium is recirculated. As is mentioned above, the removal of water in accordance with this invention is effected under a reduced pressure, whereby the temperature of the reaction medium is substantially determined by the pressure. The pressure employed in the present invention is 20 to 400 mmHg, whereby the temperature is kept at 25° to 90° C. If the pressure goes above 400 mmHg, then the temperature will exceed 90° C., resulting in an enhanced danger of explosion of chlorine dioxide. If a pressure below 20 mmHg is employed, the temperature of the system will go down below 25° C., resulting in excessively diminished rates of reaction, and the process will become uneconomical. The preferred range of pressure is 80 to 200 mmHg. The crystals of alkali metal chloride or alkali metal sulfate formed within the single generator-crystallizer in the course of reaction are withdrawn therefrom as a slurry through line 15 and separated in a solid-liquid separator 20, wherefrom the crystals of alkali metal chloride or alkali metal sulfate are discharged through line 22, while the mother liquor is returned to the single generator-crystallizer.

It is not known that highly pure chlorine dioxide can be easily manufactured without generating any acid effluent. According to this invention, it is possible to manufacture highly pure chlorine dioxide efficiently without generating any acid effluent by reducing an alkali metal chlorate with chloride ion in the presence of hydrogen peroxide and a complex catalyst containing palladium coordinated with ligands in a single generator-crystallizer under a reduced pressure of 20 to 400 mmHg.

Advantages obtained with the process of the present invention are as follows:

(1) The chemical consumptions of the chlorate, hydrochloric acid, sulfuric acid and hydrogen peroxide are reduced by adding a complex catalyst containing palladium co-ordinated with ligands.

(2) In order to obtain highly pure chlorine dioxide, generally expensive NaClO$_2$ has been used. However, in this invention it can be made inexpensive because NaClO$_3$ is used, which is available at low cost.

(3) The method described in U.S. Pat. No. 4,250,159 requires complicated instrumentation for evaporizing sulfur dioxide and produces waste water containing a high concentration of sulfuric acid.

(4) The apparatus for carrying out the process of this invention can be constructed in a simple manner thereby easily applying thereto automatic operation not requiring human labor.

The following examples are given to further illustrate this invention, but it should be understood that the invention is by no means limited thereto. On the contrary, they are given only to clarify some of the essential working modes of the present invention.

EXAMPLES 1–4

1.6 liters of an aqueous solution containing 1.0 mol/l sodium chlorate, 4.5 mol/l sodium chloride and 0.00047 mol/l chloropalladinate was put in a single generator-crystallizer made with glass of 2.5 liters and water was continuously evaporated and withdrawn therefrom under a reduced pressure of 190 mmHg at a temperature of 70° C. Twelve mol/l hydrochloric acid, 700 g/l sodium chlorate and 35 wt% hydrogen peroxide were continuously fed into the single generator-crystallizer to maintain the volume and composition of the reaction medium substantially constant. Samples were taken every 30 minutes to analyze the gaseous mixture and the reaction medium. Chlorine dioxide purity, sodium chlorate consumption and hydrogen peroxide consumption defined as follows were calculated from the analytical values.

$$\text{Chlorine dioxide purity} = \frac{ClO_2(\text{moles})}{ClO_2(\text{moles}) + Cl_2(\text{moles})} \times 100$$

$$\text{Sodium chlorate consumption} = \frac{\text{Sodium chlorate consumed}(Kg)}{\text{Chlorine dioxide generated}(Kg)}$$

$$\text{Hydrogen peroxide consumption} = \frac{\text{Hydrogen peroxide consumed}(Kg)}{\text{Chlorine dioxide generated}(Kg)}$$

The results obtained are given in Table 1.

REFERENCE EXAMPLE 1

The experiment in Example 2 was repeated except that 0.23 mol/l HCl is used without chloropalladinate and hydrogen peroxide. The results obtained are given in Table 1.

REFERENCE EXAMPLE 2

The experiment in Example 1 was repeated except that 0.21 mol/l HCl is used without chloropalladinate. The hydrogen peroxide which was fed into the single-generator crystallizer was decomposed immediately, resulting in being a trace in the reaction medium. The results obtained are also given in Table 1.

REFERENCE EXAMPLE 3

The experiment in Example 1 was repeated except that 0.20 mol/l HCl and 0.00041 mol/l chloropalladinate were used without hydrogen peroxide. The results obtained are given in Table 1.

When one compares Reference Example 2 with Reference Examples 1 and 3, it is clear that the chlorine dioxide purity in Reference Example 2 becomes higher by adding a large quantity of hydrogen peroxide, but still it remains below 80%. This also makes the sodium chlorate comsumption remarkably higher than the theoretical value of 1.57. On the contrary, even if the hydrogen peroxide consumption is decreased by reducing the quantity of hydrogen peroxide added into the reaction medium, a remarkably higher chlorine dioxide purity and a remarkably lower sodium chlorate consumption are obtained only by adding a small amount of the chloropalladinate catalyst.

EXAMPLES 5–7

Experiments in Example 1 were repeated except that the complex catalyst, the composition of reaction medium and the reaction condition as given in Table 2 were changed. The results obtained are given in Table 2 below.

REFERENCE EXAMPLE 4

The experiment in Example 5 was repeated except that 0.10 mol/l NaClO$_3$, 0.17 mol/l HCl and 0.00048 Pd(II)-glycine complex catalyst were used without hydrogen peroxide. The results obtained are given in Table 2.

TABLE 1

| | Mean composition of reaction medium | | | | | Hydrogen peroxide consumption (kg/kg-ClO$_2$) | Mean chlorine dioxide purity (%) | Sodium chlorate consumption (kg/kg-ClO$_2$) |
|---|---|---|---|---|---|---|---|---|
| | NaClO$_3$ (mol/l) | NaCl (mol/l) | HCl (mol/l) | H$_2$O$_2$ (mol/l) | Chloro-palladinate (mol/l) | | | |
| Ex. 1 | 1.1 | 4.8 | 0.15 | 0.005 | 0.00040 | 0.585 | 98.4 | 1.85 |
| Ex. 2 | 1.0 | 4.9 | 0.17 | 0.0008 | 0.00050 | 0.446 | 95.4 | 1.83 |
| Ex. 3 | 1.1 | 4.8 | 0.17 | 0.0001 | 0.00045 | 0.296 | 86.8 | 1.78 |
| Ex. 4 | 1.1 | 4.8 | 0.11 | 0.00006 | 0.00045 | 0.221 | 82.0 | 1.76 |
| Ref. Ex. 1 | 1.0 | 4.9 | 0.23 | — | 0 | — | 32.8 | 2.39 |
| Ref. Ex. 2 | 1.0 | 4.8 | 0.21 | trace | 0 | 1.91 | 79.5 | 3.18 |
| Ref. Ex. 3 | 1.1 | 4.8 | 0.20 | — | 0.00041 | — | 58.5 | 1.69 |

TABLE 2

| | Mean composition of reaction medium | | | | | Hydrogen peroxide consumption (kg/kg-ClO$_2$) | Mean chlorine dioxide purity (%) | Sodium chlorate consumption (kg/kg-ClO$_2$) |
|---|---|---|---|---|---|---|---|---|
| | NaClO$_3$ (mol/l) | NaCl (mol/l) | HCl (mol/l) | H$_2$O$_2$ (mol/l) | Pd(II)—glycine (mol/l) | | | |
| Ex. 5 | 1.1 | 4.8 | 0.33 | 0.0005 | 0.00042 | 0.288 | 92.4 | 1.65 |
| Ex. 6 | 2.9 | 3.5 | 0.22 | 0.056 | 0.00040 | 0.431 | 100 | 1.70 |
| Ex. 7 | 4.5 | 2.5 | 0.14 | 0.005 | 0.00043 | 0.305 | 100 | 1.58 |
| Ref. | 1.0 | 4.8 | 0.17 | — | 0.00048 | — | 59.1 | 1.68 |

TABLE 2-continued

| | Mean composition of reaction medium | | | | | Hydrogen peroxide consumption (kg/kg-ClO$_2$) | Mean chlorine dioxide purity (%) | Sodium chlorate consumption (kg/kg-ClO$_2$) |
|---|---|---|---|---|---|---|---|---|
| | NaClO$_3$ (mol/l) | NaCl (mol/l) | HCl (mol/l) | H$_2$O$_2$ (mol/l) | Pd(II)—glycine (mol/l) | | | |
| Ex. 4 | | | | | | | | |

If the reaction temperature and pressure are reduced and the concentration of sodium chlorate in the reaction medium increased, the chlorine dioxide purity increases and the sodium chlorate consumption is reduced.

EXAMPLE 8

One-point-six liters of an aqueous solution containing 1.0 mol/l sodium chlorate, 1.0 mol/l sodium chloride and a complex catalyst consisting of palladium(II) and 2,4-pentanedione was put in a 2.5 liters single generator-crystallizer made of glass and water was continuously evaporated to withdraw therefrom under a reduced pressure or 190 mmHg at a temperature of 70° C. 98% Sulfuric acid, 700 g/l sodium chlorate, 300 g/l sodium chloride and 35% hydrogen peroxide were continuously fed into the single generator-crystallizer to maintain the volume and the composition of the reaction medium substantially constant. Samples were taken every 30 minutes to analyze the gaseous mixture and the reaction medium. Chlorine dioxide purity, sodium consumption and hydrogen peroxide consumption were calculated from the analytical values. The results obtained are given in Table 3.

EXAMPLES 9-11

The experiments in Examples 8 were repeated except for the varied compositions of the reaction medium. The results obtained are given in Table 3.

Even if sulfuric acid is used in place of hydrochloric acid, highly pure chlorine dioxide is obtained.

REFERENCE EXAMPLE 5

The experiment was conducted with the mean composition of the reaction medium as given in Table 3. The results obtained are given in Table 3.

TABLE 3

| | Mean composition of reaction medium | | | | | | Hydrogen peroxide consumption (kg/kg-ClO$_2$) | Mean chlorine dioxide purity (%) | Sodium chlorate consumption (kg/kg-ClO$_2$) |
|---|---|---|---|---|---|---|---|---|---|
| | NaClO$_3$ (mol/l) | NaCl (mol/l) | Na$_2$SO$_4$ (mol/l) | H$_2$SO$_4$ (mol/l) | H$_2$O$_2$ (mol/l) | Pd(II)—2,4-pentanedione catalyst (mol/l) | | | |
| Ex. 8 | 0.76 | 0.65 | 1.35 | 1.6 | 0.018 | 0.000054 | 0.381 | 99.6 | 1.74 |
| Ex. 9 | 0.84 | 0.46 | 1.43 | 1.9 | 0.0006 | 0.000078 | 0.220 | 92.1 | 1.68 |
| Ex. 10 | 0.16 | 0.73 | 0.92 | 2.0 | 0.004 | 0.000048 | 0.393 | 91.4 | 1.83 |
| Ex. 11 | 0.19 | 0.16 | 0.82 | 2.1 | 0.020 | 0.000067 | 0.544 | 100 | 1.79 |
| Ref. Ex. 5 | 0.72 | 0.63 | 1.36 | 1.7 | — | 0.000051 | — | 60.3 | 1.66 |

What is claimed is:

1. A process for manufacturing highly pure chlorine dioxide by reducing an alkali metal chlorate selected from the group consisting of sodium chlorate and potassium chlorate with chloride ion, in a strong acidic reaction medium selected from the group consisting of sulfuric acid, hydrochloric acid and mixtures thereof in the presence of hydrogen peroxide and a complex catalyst palladium(II) with chloride ion, in a single generator-crystallizer at a temperature of 25° to 90° C. under a reduced pressure of 20 to 400 mmHg.

2. The process of claim 1 in which said acidic reaction medium is sulfuric acid in a concentration of from 0.5 mol/l to 2.5 mol/l of the reaction medium.

3. The process of claim 1 in which said acidic reaction medium is hydrochloric acid in a continuation of from 0.01 mol/l to 1.0 mol/l of the reaction medium.

4. The process of claim 1 in which said alkali metal chlorate is in a concentration of from 0.1 mol/l to 5 mol/l of the reaction medium.

5. The process of claim 1 in which said complex catalyst containing palladium co-ordinated with ligands is present in a concentration of from 0.00001 mol/l to 0.01 mol/l of the reaction medium.

6. The process of claim 1 in which said hydrogen peroxide is present in a concentration of from 0.00005 mol/l to 0.1 mol/l of the reaction medium.

* * * * *